United States Patent
Shi

(10) Patent No.: US 9,964,739 B1
(45) Date of Patent: May 8, 2018

(54) OPTICAL CAMERA LENS

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 1 day.

(21) Appl. No.: 15/416,615

(22) Filed: Jan. 26, 2017

(30) Foreign Application Priority Data

Dec. 14, 2016 (CN) .......................... 2016 1 1156248

(51) Int. Cl.
| | |
|---|---|
| *G02B 13/18* | (2006.01) |
| *G02B 9/62* | (2006.01) |
| *G02B 13/00* | (2006.01) |
| *G02B 13/04* | (2006.01) |
| *G02B 5/00* | (2006.01) |
| *G02B 27/00* | (2006.01) |
| *G02B 3/04* | (2006.01) |

(52) U.S. Cl.
CPC ............ *G02B 13/0045* (2013.01); *G02B 9/62* (2013.01); *G02B 3/04* (2013.01); *G02B 5/005* (2013.01); *G02B 13/001* (2013.01); *G02B 13/002* (2013.01); *G02B 13/04* (2013.01); *G02B 13/18* (2013.01); *G02B 27/0025* (2013.01)

(58) Field of Classification Search
CPC .. G02B 13/0045; G02B 9/62; G02B 27/0025; G02B 13/18; G02B 5/005; G02B 3/04; G02B 13/002; G02B 13/04; G02B 13/001
USPC .................. 359/713, 740, 752, 756, 762
See application file for complete search history.

(56) References Cited

U.S. PATENT DOCUMENTS

| | | | |
|---|---|---|---|
| 9,557,534 B1* | 1/2017 | Liao ................. | G02B 13/0045 |
| 9,715,088 B1* | 7/2017 | Yang ................. | G02B 13/0045 |
| 2014/0009844 A1* | 1/2014 | Tsai ................. | G02B 9/62 359/713 |
| 2014/0368931 A1* | 12/2014 | Noda ................. | G02B 13/0045 359/740 |
| 2015/0168692 A1* | 6/2015 | Kitahara ............. | G02B 13/04 359/752 |
| 2016/0085055 A1* | 3/2016 | Asami ................ | G02B 9/64 359/755 |
| 2017/0227740 A1* | 8/2017 | Hsueh ............... | G02B 13/0045 |

* cited by examiner

*Primary Examiner* — Evelyn A Lester
(74) *Attorney, Agent, or Firm* — Na Xu; IPro, PLLC

(57) ABSTRACT

Disclosed is an optical camera lens, including: a first lens having negative refraction power, a second lens having positive refraction power, an aperture, a third lens having positive refraction power, a fourth lens having negative refraction power, a fifth lens having positive refraction power and a sixth lens having negative refraction power; a focal length of the integral optical camera lens is f, a focal length of the first lens is f1, a focal length of the second lens is f2, a focal length of the third lens is f3, a focal length of the fourth lens is f4, a focal length of the fifth lens is f5 and a focal length of the sixth lens is f6, which satisfy following relational expressions: $-2.5<f1/f<-1.0$, $2.7<f2/f<2.2$, $1<f3/f<2$, $-3.1<f4/f<-1.2$, $0.98<f5/f<1.1$, $-2.4<f6/f4<-1.9$. The optical camera lens provided by the present disclosure has excellent optical characteristics and structural length at the same time.

5 Claims, 3 Drawing Sheets

OPTICAL CAMERA LENS

TECHNICAL FIELD

The present disclosure relates to the field of optical lens and, particularly, relates to an optical camera lens adapted for portable terminal devices such as smart cellphone, digital camera etc. and for camera devices such as monitor, PC lens etc.

BACKGROUND

In recent years, as the booming development of the smart cellphone, the need on miniaturized camera lens is increasing gradually. However, the photosensitive component of conventional camera lens is either a charge coupled device (Charge Coupled Device, CCD) or a complementary metallic-oxide semiconductor sensor (Complementary Metal-Oxide Semiconductor Sensor, CMOS Sensor). With the development of semiconductor processing technique, pixel size of the photosensitive component is reduced. In addition, the electronic product at present is developed to have better functions and a lighter and thinner configuration. Therefore, a miniaturized camera lens with better imaging quality has already become the mainstream in the current market.

In order to obtain better imaging quality, a traditional lens carried in a cellphone camera usually adopts a three-lens or four-lens structure. As the development of technologies and increasing of user's diversified needs, in the situation of the pixel area of the photosensitive component being reduced, and the requirements of the system on imaging quality being increased constantly, a six-lens structure appears in the lens design gradually. However, there is less optical system with a six-lens structure having large field of view, which cannot achieve excellent optical properties and structural length at the same time.

DESCRIPTION OF EMBODIMENTS

In order to make objectives, technical solutions and advantages of the present disclosure more clearly, embodiments of the present disclosure will be illustrated in detail with reference to the accompanying drawings. Those skilled in the art should understand, in each implementing manner of the present disclosure, in order to make the reader understand the present disclosure, a plurality of technical details have been proposed. However, the technical solutions protected by the present disclosure shall also be implemented without these technical details and the various modifications and variations presented in the embodiments.

Figure 1:
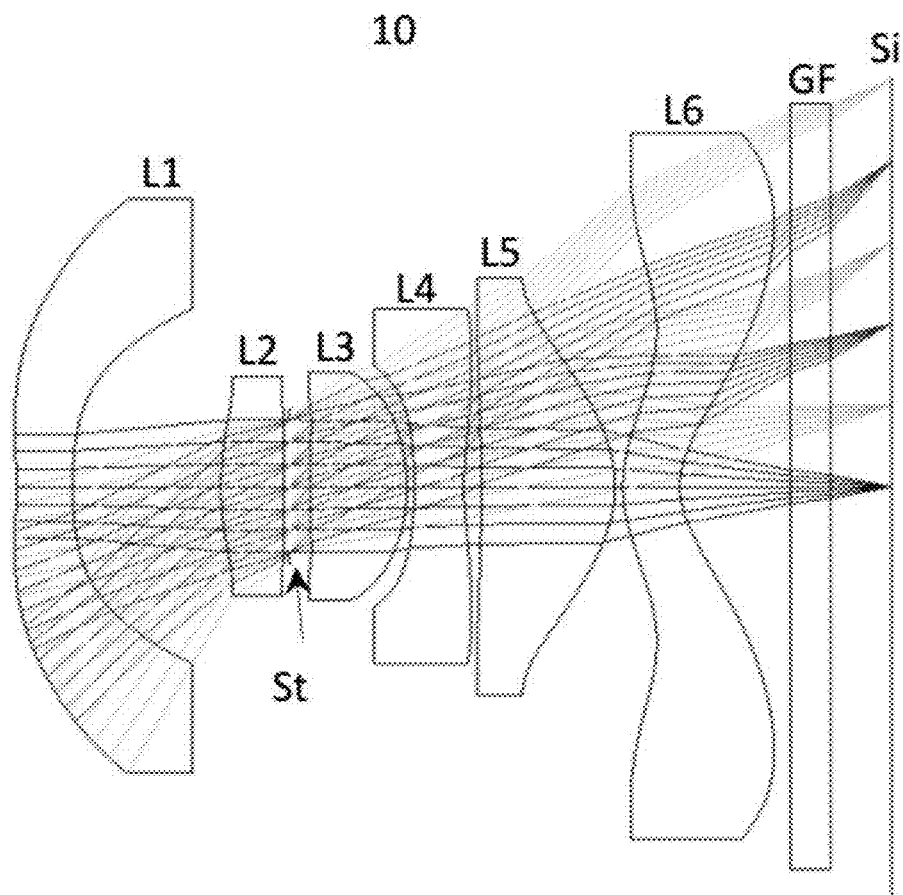
FIG. 1 is a structural schematic diagram of an optical camera lens according to an exemplary embodiment of the present disclosure.

Referring to the figures, the present disclosure provides an optical camera lens. FIG. 1 shows an optical camera lens 10 according to an exemplary embodiment of the present disclosure, the optical camera lens 10 includes six lenses. Specifically, the optical camera lens 10, from an object side to an image side, successively includes: a first lens L1, a second lens L2, an aperture St, a third lens L3, a fourth lens L4, a fifth lens L5, and a sixth lens L6. An optical component such as an optical filter GF can be arranged between the sixth lens L6 and an imaging surface Si.

The first lens L1 has negative refraction power, an object-side surface thereof bulges outward to be a convex surface, an image-side surface thereof is a concave surface, which is advantageous to collect imaging light with a wide angle. The second lens L2 has positive refraction power, in the present embodiment, an object-side surface of the second lens L2 is a convex surface. The aperture St is arranged between the second lens L2 and the third lens L3. The third lens L3 has positive refraction power, in the present embodiment, an image-side surface of the third lens L3 is a convex surface. The second lens L2 and the third lens L3 are both provided as lenses with positive refraction power, which can focus major focal power of the system, so as to effectively reduce length of the system. The fourth lens L4 has negative refraction power, in the present embodiment, an object-side surface of the fourth lens L4 is a concave surface. The fifth lens L5 has positive refraction power, in the present embodiment, an image-side surface of the fifth lens L5 is a convex surface. The sixth lens L6 has negative refraction power.

Herein, a focal length of the integral optical camera lens is defined as f, a focal length of the first lens is defined as f1, a focal length of the second lens is defined as f2, a focal length of the third lens is defined as f3, a focal length of the fourth lens is defined as f4, a focal length of the fifth lens is defined as f5, a focal length of the sixth lens is defined as f6. The f1, f2, f3, f3, f4 and f5 satisfy the following relational expressions: $-2.5<f1/f<-1.0$, $2.7<f2/f<2.2$, $1<f3/f<2$, $-3.1<f4/f<-1.2$, $0.98<f5/f<1.1$, $-2.4<f6/f<-1.9$.

When the focal length of the optical camera lens 10 meet the above relational expressions, the refraction power configuration of each lens can be controlled/adjusted, which can correct aberration so as to guarantee imaging quality, obtain excellent optical properties and, at the same time, meet the design requirements of the lens on low structural length, and have advantage of low sensitivity, which is adaptive for an imaging system with large field of view, thereby is good for mass production.

Specifically, in an embodiment of the present disclosure, the focal length f1 of the first lens, the focal length f2 of the second lens, the focal length f3 of the third lens, the focal length f4 of the fourth lens, the focal length f5 of the fifth lens and the focal length f6 of the sixth lens can be designed so as to satisfy the following relational expressions: $-3.5<f1<-2.2$; $3.1<f2<4.1$; $1.5<f3<2.3-3.1<f4<-1.8$; $1.1<f5<2.3$; $-3.5<f6<-2.1$, unit: millimeter (mm). Such a design can further shorten the total track length TLL of the integral optical camera lens 10, so as to maintain the characteristics of miniaturization.

In the optical camera lens 10 of the present disclosure, each lens can be made of glass or plastic, if the lens is made of glass, which can increase the freedom of the refraction power configuration of the optical system of the present disclosure, if the lens is made of plastic, which can effectively reduce production cost.

In an embodiment of the present disclosure, all lenses are plastic lenses. Further, in an embodiment of the present disclosure, a refractive index n1 of the first lens, a refractive index n2 of the second lens, a refractive index n3 of the third lens, a refractive index n4 of the fourth lens, a refractive index n5 of the fifth lens and a refractive index n6 of the sixth lens can be designed to satisfy the following relational expressions: $1.50<n1<1.55$; $1.50<n2<1.55$; $1.50<n3<1.55$; $1.60<n4<1.70$; $1.50<n5<1.55$; $1.50<n6<1.55$. Such a design is advantageous for an appropriate matching of the lenses with material, so that the optical camera lens 10 can obtain better imaging quality.

It should be noted that, in an embodiment of the present disclosure, an abbe number v1 of the first lens, an abbe number v2 of the second lens, an abbe number v3 of the third lens, an abbe number v4 of the fourth lens, an abbe number v5 of the fifth lens and an abbe number v6 of the sixth lens can be designed to satisfy the following relational expressions: 40<v1<60; 40<v2<60; 40<v3<60; 15<v4<30; 40<v5<60; 40<v6<60. Such a design can suppress the phenomenon of optical chromatic aberration during imaging by the optical camera lens 10. Herein, the fourth lens can adopt an optical material with high refraction index and low abbe number, which can effectively reduce chromatic aberration of the system.

Besides, the surface of the lens can be an aspheric surface, the aspheric surface can be easily made into shapes other than spherical surface, so as to obtain more controlling varieties, which are used to eliminate aberration so as to reduce the number of the lens used, thereby can reduce the total length of the optical camera lens of the present disclosure effectively. In the embodiments of the present disclosure, the surfaces of all the lenses are aspheric surfaces.

Optionally, an inflection point and/or a stationary point can be provided on the object-side surface and/or the image-side surface of the lens, so as to satisfy the imaging needs on high quality, the specific implementing solution is as follows.

The design data of the optical camera lens 10 according to Embodiment 1 of the present disclosure is shown as follows.

Table 1 and Table 2 show data of the lens in the optical camera lens 10 according to Embodiment 1 of the present disclosure.

TABLE 1

| Focal length (mm) | |
| --- | --- |
| f | 1.4475 |
| f1 | −3.284 |
| f2 | 3.885 |
| f3 | 1.854 |
| f4 | −2.185 |
| f5 | 1.533 |
| f6 | −3.198 |
| f12 | 62.08 |
| f34 | 7.6717 |
| f56 | 2.088 |
| ff | 62.08 |
| fr | 1.936 |

In which, meaning of each symbol is as follows.
f: focal length of the optical camera lens 10;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f12: combined focal length of the first lens L1 and the second lens L2;
f34: combined focal length of the third lens L3 and the fourth lens L4;
f56: combined focal length of the fifth lens L5 and the sixth lens L6;
ff: combined focal length of optical components with diopter arranged between Stop (aperture) and the object;
fr: combined focal length of optical components with diopter arranged between Stop (aperture) and the imaging surface Si;

TABLE 2

| | | Curvature radius (R) (mm) | Thickness/ Distance (d) (mm) | | Sagittal height (SAG) (mm) | Semi- diameter (SD) | | Refractive index (nd) | | Abbe number (vd) |
| --- | --- | --- | --- | --- | --- | --- | --- | --- | --- | --- |
| L1 | R1 | −4.65276 | d1 = 0.297 | SAG11 | 0.585 | 1.622 | n1 | 1.544 | v1 | 55.95 |
| | R2 | 2.982254 | d2 = 0.770 | SAG12 | 0.622 | 1.005 | | | | |
| L2 | R3 | 1.813343 | d3 = 0.325 | SAG21 | 0.061 | 0.620 | n2 | 1.544 | v2 | 55.95 |
| | R4 | 11.72355 | d4 = 0.034 | SAG22 | 0.006 | 0.462 | | | | |
| L3 | R5 | 7.424211 | d5 = 0.104 | SAG31 | −0.005 | 0.491 | n3 | 1.544 | v3 | 55.95 |
| | R6 | −1.14339 | d6 = 0.506 | SAG32 | −0.293 | 0.644 | | | | |
| L4 | R7 | −5.64617 | d7 = 0.037 | SAG41 | −0.207 | 0.682 | n4 | 1.651 | v4 | 21.4946 |
| | R8 | 1.957675 | d8 = 0.260 | SAG42 | 0.017 | 1.002 | | | | |
| L5 | R9 | −6.8861 | d9 = 0.091 | SAG51 | −0.020 | 1.064 | n5 | 1.544 | v5 | 55.95 |
| | R10 | −0.77279 | d10 = 0.690 | SAG52 | −0.484 | 1.182 | | | | |
| L6 | R11 | 0.820523 | d11 = 0.039 | SAG61 | 0.042 | 1.683 | n6 | 1.544 | v6 | 55.95 |
| | R12 | 0.485984 | d12 = 0.300 | SAG62 | 0.318 | 1.998 | | | | |

R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the sixth lens L6, respectively. Meanings of other symbols are as follows.

d0: axial distance from the aperture St to the object-side surface of the first lens L1;
d1: axial thickness of the first lens L1;
d2: axial distance from the image-side surface of the first lens L1 to the object-side surface of the second lens L2;
d3: axial thickness of the second lens L2;
d4: axial distance from the image-side surface of the second lens L2 to the object-side surface of the third lens L3;
d5: axial thickness of the third lens L3;
d6: axial distance from the image-side surface of the third lens L3 to the object-side surface of the fourth lens L4;
d7: axial thickness of the fourth lens L4;
d8: axial distance from the image-side surface of the fourth lens L4 to the object-side surface of the fifth lens L5;
d9: axial thickness of the fifth lens L5;
d10: axial distance from the image-side surface of the fifth lens L5 to the object-side surface of the sixth lens L6;
d11: axial thickness of the sixth lens L6;
d12: axial distance from the image-side surface of the sixth lens L6 to the imaging surface;

SAG: sagittal height, vertical distance between topmost point and bottommost point of the lens;

SAG11: sagittal height of the surface R1 of the first lens L1;

SAG12: sagittal height of the surface R2 of the first lens L1;

SAG21: sagittal height of the surface R3 of the second lens L2;

SAG22: sagittal height of the surface R4 of the second lens L2;

SAG31: sagittal height of the surface R5 of the third lens L3;

SAG32: sagittal height of the surface R6 of the third lens L3;

SAG41: sagittal height of the surface R7 of the fourth lens L4;

SAG42: sagittal height of the surface R8 of the fourth lens L4;

SAG51: sagittal height of the surface R9 of the fifth lens L5;

SAG52: sagittal height of the surface R10 of the fifth lens L5;

SAG61: sagittal height of the surface R11 of the sixth lens L6;

SAG62: sagittal height of the surface R12 of the sixth lens L6;

SD: semi-diameter parameter of the lens surface;

n1: refractive index of the first lens L1;
n2: refractive index of the second lens L2;
n3: refractive index of the third lens L3;
n4: refractive index of the fourth lens L4;
n5: refractive index of the fifth lens L5;
n6: refractive index of the sixth lens L6;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6.

In the Embodiment 1 of the present disclosure, the distance from the image-side surface of the sixth lens L6 to the imaging surface Si is 0.570 mm, the thickness of the optical filter GF is 0.21 mm.

Table 3 and Table 4 show the design data of inflection point and stationary point of each lens in the optical camera lens 10 according to Embodiment 1 of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5; R11, R12 respectively represent the object-side surface and the image-side surface of the sixth lens L6. The data corresponding to the 'position of inflection point' column is the vertical distance from the inflection point disposed on each lens surface to the optical axis of the optical camera lens 10. The data corresponding to the 'position of stationary point' column is the vertical distance from the stationary point disposed on each lens surface to the optical axis of the optical camera lens 10.

TABLE 3

|  | Number of inflection point | Position 1 of the inflection point | Position 2 of the inflection point |
|---|---|---|---|
| R1 | 1 | 0.205 |  |
| R2 | 1 | 0.995 |  |
| R3 | 1 | 0.405 |  |
| R4 | 1 | 0.175 |  |
| R5 | 1 | 0.235 |  |
| R6 | 0 |  |  |
| R7 | 0 |  |  |
| R8 | 1 | 0.295 |  |
| R9 | 1 | 0.775 |  |
| R10 | 1 | 0.765 |  |
| R11 | 2 | 0.435 | 1.265 |
| R12 | 1 | 0.505 |  |

TABLE 4

|  | Number of the stationary point | Position 1 of the stationary point |
|---|---|---|
| R1 | 1 | 0.365 |
| R2 | 0 |  |
| R3 | 1 | 0.585 |
| R4 | 1 | 0.275 |
| R5 | 1 | 0.255 |
| R6 | 0 |  |
| R7 | 0 |  |
| R8 | 1 | 0.715 |
| R9 | 1 | 0.935 |
| R10 | 0 |  |
| R11 | 1 | 0.885 |
| R12 | 1 | 1.495 |

Table 5 shows data of several other parameters of the optical camera lens according to Embodiment 1 of the present disclosure. In which, αPE is a linear expansion coefficient of the optical filter GF, YC1 a vertical distance between the intersection of light and the image-side surface of the fifth lens and the optical axis, the light is with an incident angle of 36 degrees and crosses the diaphragm, SAGc11 is the SAG on the stationary point of the object-side surface of the first lens L1, SAGc62 is the SAG on the stationary point of the image-side surface of the fifth lens L5, ET1 is a minimum horizontal distance between the object-side surface and image-side surface of the first lens L1 which is parallel to but not provided on the optical axis, MTF400 is a MTF value in the center of 400 lp/mm.

TABLE 5

| αPE | 0.0000071 |
|---|---|
| YC1 (mm) | 1.992 |
| SAGc11 (mm) | −0.00653 |
| SAGc62 (mm) | 0.489 |
| ET1 (mm) | 0.298 |
| MTF400 | 0.292 |

Figure 2:
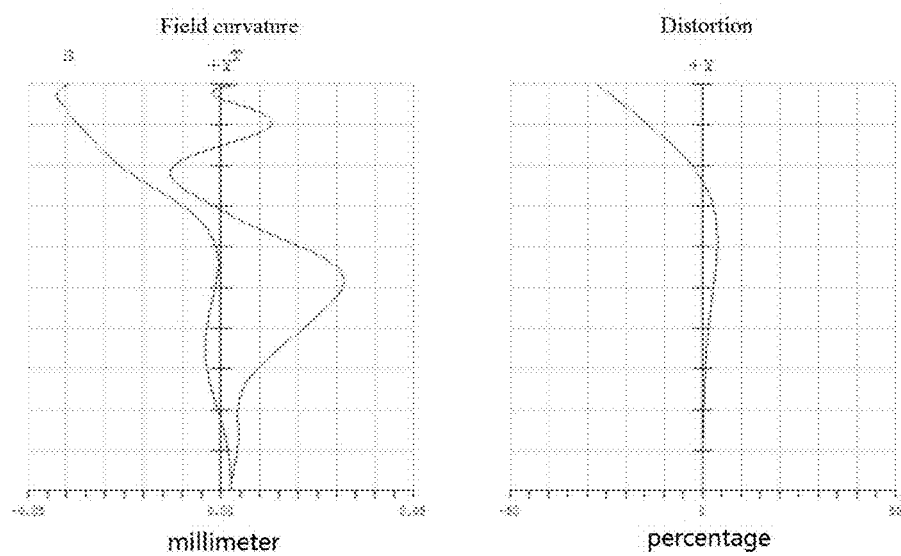
FIG. 2 is a schematic diagram of field curvature and distortion of an optical camera lens shown in FIG. 1.
Figure 3:
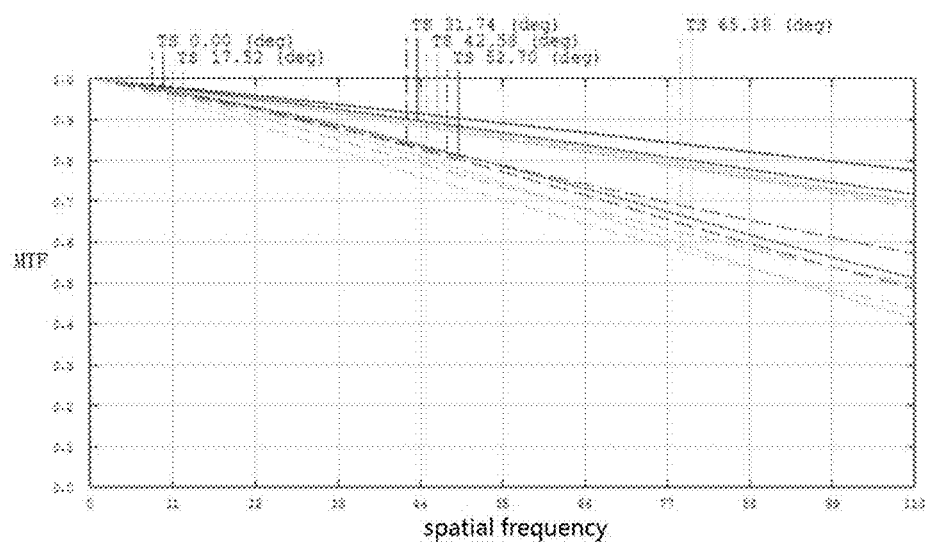
FIG. 3 is a schematic diagram of MTF curve of an optical camera lens shown in FIG. 1.

FIG. 2 is a schematic diagram of astigmatism field curvature and distortion of an optical camera lens shown in FIG. 1. FIG. 3 is a schematic diagram of modulation transfer function (Modulation Transfer Function, MTF) curve of optical camera lens shown in FIG. 1.

The following table 6 lists values with respect to each conditional expression in the present Embodiment 1 according to the above conditional expressions. Obviously, the optical camera system of the present Embodiment 1 satisfies the above conditional expressions.

TABLE 6

| Conditions | Embodiment 1 |
|---|---|
| −2.5 < f1/f < −1.0 | −2.2687 |
| 2.7 < f2/f < 2.2 | 2.68394 |
| 1 < f3/f < 2 | 1.28083 |
| −3.1 < f4/f < −1.2 | −1.5095 |
| 0.98 < f5/f < 1.1 | 1.05907 |
| −2.4 < f6/f < −1.9 | −2.2093 |

In the present embodiment, the pupil diameter of the optical camera lens is 0.603 mm, the image height of full field of view of the optical camera lens is 2.297 mm, the field of view angle in the diagonal direction is 130°, the chief ray angle (Chief Ray Angle, CRA) of the largest field of view is 32.2°.

Person skilled in the art shall understand, the above implementing manners are detailed embodiments of the present disclosure, however, in practical application, various modifications may be made to the forms and details thereof, without departing from the spirit and scope of the present disclosure.

What is claimed is:

1. An optical camera lens, from an object side to an image side, successively comprising:
   a first lens having negative refraction power;
   a second lens having positive refraction power;
   an aperture;
   a third lens having positive refraction power;
   a fourth lens having negative refraction power;
   a fifth lens having positive refraction power; and
   a sixth lens having negative refraction power;
   wherein a focal length of the integral optical camera lens is f, a focal length of the first lens is f1, a focal length of the second lens is f2, a focal length of the third lens is f3, a focal length of the fourth lens is f4, a focal length of the fifth lens is f5 and a focal length of the sixth lens is f6, which satisfy following relational expressions:

$-2.5 < f1/f < -1.0$;

$2.7 < f2/f < 2.2$;

$1 < f3/f < 2$;

$-3.1 < f4/f < -1.2$;

$0.98 < f5/f < 1.1$;

$-2.4 < f6/f < -1.9$.

2. The optical camera lens as described in claim 1, wherein the focal length f1 of the first lens, the focal length f2 of the second lens, the focal length f3 of the third lens, the focal length f4 of the fourth lens, the focal length f5 of the fifth lens and the focal length f6 of the sixth lens satisfy following relational expressions, respectively:

$-3.5 < f1 < -2.2$;

$3.1 < f2 < 4.1$;

$1.5 < f3 < 2.3$;

$-3.1 < f4 < -1.8$;

$1.1 < f5 < 2.3$;

$-3.5 < f6 < -2.1$.

3. The optical camera lens as described in claim 1, wherein a refractive index n1 of the first lens, a refractive index n2 of the second lens, a refractive index n3 of the third lens, a refractive index n4 of the fourth lens, a refractive index n5 of the fifth lens and a refractive index n6 of the sixth lens satisfy following relational expressions, respectively:

$1.50 < n1 < 1.55$;

$1.50 < n2 < 1.55$;

$1.50 < n3 < 1.55$;

$1.60 < n4 < 1.70$;

$1.50 < n5 < 1.55$;

$1.50 < n6 < 1.55$.

4. The optical camera lens as described in claim 1, wherein an abbe number v1 of the first lens, an abbe number v2 of the second lens, an abbe number v3 of the third lens, an abbe number v4 of the fourth lens, an abbe number v5 of the fifth lens and an abbe number v6 of the sixth lens satisfy following relational expressions, respectively:

$40 < v1 < 60$;

$40 < v2 < 60$;

$40 < v3 < 60$;

$15 < v4 < 30$;

$40 < v5 < 60$;

$40 < v6 < 60$.

5. The optical camera lens as described in claim 1, wherein an aperture value F of the optical camera lens is less than 2.5.

* * * * *